United States Patent
Le Loarer et al.

(10) Patent No.: US 7,090,825 B2
(45) Date of Patent: *Aug. 15, 2006

(54) ALUMINA AGGLOMERATES AND PREPARATION METHOD THEREOF

(75) Inventors: Jean-Luc Le Loarer, Salindres (FR); Christophe Nedez, Salindres (FR)

(73) Assignee: Axens, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/473,938

(22) PCT Filed: Mar. 27, 2002

(86) PCT No.: PCT/FR02/01071

§ 371 (c)(1), (2), (4) Date: Dec. 16, 2004

(87) PCT Pub. No.: WO02/081375

PCT Pub. Date: Oct. 17, 2002

(65) Prior Publication Data

US 2005/0079126 A1    Apr. 14, 2005

(30) Foreign Application Priority Data

Apr. 4, 2001  (FR) .................. 01 04587

(51) Int. Cl.
- *C01F 7/02* (2006.01)
- *B01J 20/08* (2006.01)
- *B01J 21/04* (2006.01)
- *B01J 32/00* (2006.01)

(52) U.S. Cl. ............ 423/625; 423/626; 423/628; 502/355; 502/415; 502/439; 502/527.11; 502/527.19; 502/527.24

(58) Field of Classification Search ............ 423/625, 423/628, 626; 502/355, 415, 439, 527.11, 502/527.19, 527.24
See application file for complete search history.

(56) References Cited

U.S. PATENT DOCUMENTS

| | | |
|---|---|---|
| 5,055,019 A | 10/1991 | Meyer et al. |
| 5,055,443 A | 10/1991 | Mercier et al. |
| 2002/0027304 A1* | 3/2002 | Robson et al. ............ 264/12 |

(Continued)

FOREIGN PATENT DOCUMENTS

DE  3823895 C1  12/1989

(Continued)

OTHER PUBLICATIONS

International Search Report—PCT/FR02/01071.

*Primary Examiner*—Timothy Vanoy
(74) *Attorney, Agent, or Firm*—Welsh & Katz

(57) ABSTRACT

The invention relates to alumina agglomerates of the type obtained by dehydrating an aluminium oxyhydroxide or hydroxide, agglomerating the alumina thus obtained, hydrothermally treating the agglomerates and calcinating same. Said agglomerates are characterised in that: the $V_{37\,Å}$ thereof is greater than or equal to 75 ml/100 g, preferably greater than or equal to 80 ml/100 g and, better still, greater than or equal to 85 ml/100 g; the $V_{0.1\,\mu m}$ thereof is less than or equal to 31 ml/100 g; and the $V_{0.2\,\mu m}$ thereof is less than or equal to 20 ml/100 g, preferably less than or equal to 15 ml/100 g and, better still, less than or equal to 10 ml/100 g. The invention also relates to a catalyst carrier, an intrinsic catalyst or an absorbent, in particular for use in the petroleum and petrochemical industry, comprising such alumina agglomerates. Moreover, the invention relates to methods for preparing said agglomerates.

25 Claims, 1 Drawing Sheet

U.S. PATENT DOCUMENTS

2002/0043734 A1* 4/2002 Ohji et al. .................. 264/43
2003/0017945 A1* 1/2003 Kolenda et al. ............ 502/355
2003/0052047 A1* 3/2003 Pinnavaia et al. .......... 208/297

FOREIGN PATENT DOCUMENTS

| | | | |
|---|---|---|---|
| DE | 198 36 821 A1 | 2/2000 |
| DE | 198 43 241 A1 | 3/2000 |
| EP | 0 656 413 A1 | 6/1995 |
| EP | 0 691 210 A1 | 1/1996 |
| EP | 0 849 223 A1 | 6/1998 |
| FR | 2 764 208 | 12/1998 |

* cited by examiner

ALUMINA AGGLOMERATES AND PREPARATION METHOD THEREOF

The invention relates to the field of alumina agglomerates that can be used especially as adsorbents, as catalyst supports or as catalysts. More precisely, it relates to novel alumina agglomerates having specific physical characteristics, in particular from the standpoint of their porosity, giving them particularly advantageous mechanical properties. The invention also relates to a process for obtaining such agglomerates. Finally, it relates to their use as catalyst supports, as catalysts or as adsorbents.

Certain catalytic processes, such as heterogeneous catalysis, for example in the field of treatment of petroleum oil cuts or the treatment of gaseous effluents, such as the exhaust gases from internal combustion engines, require the use of supports having a high porosity and good mechanical properties, such as good crush resistance and/or attrition resistance.

Alumina-based supports meet these criteria, especially when they have undergone a hydrothermal treatment, for example after the alumina has been made in the form of agglomerates. This is because such a treatment substantially improves the mechanical properties of the agglomerates.

This hydrothermal treatment consists in impregnating the alumina agglomerates with water or an aqueous acid solution, and then heating these agglomerates, placed inside an autoclave, to a temperature of above 80° C. European Patent No. EP-A-0 387 109, in the name of the Applicant, describes an example of an advantageous process for carrying out this hydrothermal treatment.

The agglomerates thus treated are then dried and then subjected to a heat treatment called "calcination" at a given temperature. This calcination temperature is chosen according to the desired specific surface area and to the temperature at which these supports will be used.

The efficiency of such alumina agglomerates is to a large part dependent on their porosity: a high porosity is often favorable for the various applications envisioned, because of the lower diffusional and/or tortuosity constraints. In applications in which the support will be used not only for satisfactorily dispersing a metallic active phase or phases supplied during production of the catalyst, but also to retain contaminants, such as during a hydrometallation operation, a high porosity is advantageous. However, a high porosity is generally regarded as going hand in hand with a degradation of the mechanical strength of the material. The use of alumina agglomerates with a high porosity is therefore difficult in important applications, specially in catalyst supports for which the mechanical strength of the alumina to a large extent governs the duration of use of the catalyst. It turns out that degradation of the mechanical strength of the catalyst during use has dramatic effects, both technically and economically, on the operating process.

The object of the invention is to provide alumina agglomerates users with materials, exhibiting an excellent compromise between high porosity and mechanical strength that makes them compatible with demanding applications from the latter standpoint.

For this purpose, the subject of the invention is alumina agglomerates of the type obtained by the treatment of an aluminum hydroxide or oxyhydroxide, agglomeration of the alumina thus obtained, hydrothermal treatment of the agglomerates and calcination, characterized in that:

they have a $V_{37 \text{ Å}}$ of greater than or equal to 75 ml/100 g, preferably greater than or equal to 80 ml/100 g and even more preferably greater than or equal to 85 ml/100 g;

they have a $V_{0.1 \ \mu m}$ of less than or equal to 31 ml/100 g, preferably less than or equal to 25 ml/100 g, even more preferably less than or equal to 20 ml/100 g and optimally less than or equal to 15 ml/100 g; and in that:

they have a $V_{0.2 \ \mu m}$ of less than or equal to 20 ml/100 g, preferably less than or equal to 15 ml/100 g and even more preferably less than or equal to 10 ml/100 g.

Preferably, they have a $V_{1 \ \mu m}$ of less than or equal to 7 ml/100 g, preferably less than or equal to 5.5 ml/100 g and even more preferably less than or equal to 4 ml/100 g.

Preferably, they have a $V_{0.1 \ \mu m}/V_{0.2 \ \mu m}$ ratio of greater than or equal to 1.5, preferably greater than or equal to 2 and even more preferably greater than or equal to 2.5.

Preferably, they have simultaneously a $V_{37 \text{ Å}}$ of greater than or equal to 80 ml/100 g, a $V_{0.1 \ \mu m}$ of less than or equal to 15 ml/100 g, a $V_{0.2 \ \mu m}$ of less than or equal to 10 ml/100 g, a $V_{1 \ \mu m}$ of less than or equal to 4 ml/100 g and a $V_{0.1 \ \mu m}/V_{0.2 \ \mu m}$ ratio of greater than or equal to 2.5.

Preferably, they are obtained from dehydrated hydrargillite.

Preferably, they are in the form of beads or of extruded materials, or of crushed materials, or in the form of monoliths.

The subjects of the invention are also a catalyst support, especially for the petroleum or petrochemical industry, consisting of alumina agglomerates of the abovementioned type, an intrinsic catalyst, especially for the petroleum or petrochemical industry, consisting of alumina agglomerates of the abovementioned type, and an adsorbent, especially for the petroleum or petrochemical industry, consisting of alumina agglomerates of the abovementioned type.

The subject of the invention is also a process for producing alumina agglomerates of the abovementioned type, in which:

an aluminum hydroxide or oxyhydroxide, preferably hydrargillite, undergoes flash dehydration in order to obtain an active alumina powder;

said active alumina powder undergoes a forming operation so as to obtain beads with a green fill density of between 500 and 1100 kg/m$^3$, preferably between 700 and 950 kg/m$^3$ inclusive, and a diameter predominantly between 0.8 and 10 mm, preferably between 1 and 5 mm;

said beads undergo a heat treatment so as to provide them with a specific surface area of between 50 and 420 m$^2$/g;

said beads undergo a hydrothermal treatment by impregnation with water or an aqueous solution, preferably aqueous acid solution, followed by residence in an autoclave at a temperature of above 80° C.; and the agglomerates thus obtained are calcined, preferably between 500 and 1300° C.

After the heat treatment that follows granulation, the alumina beads preferably have a $V_{37 \text{ Å}}$ of greater than 65 ml/100 g, preferably greater than 70 ml/100 g.

The active alumina powder obtained after dehydrating the aluminum hydroxide or oxyhydroxide is preferably ground in order to obtain a powder with a median particle size $d_{50}$ of preferably between 5 and 25 μm.

The active alumina powder obtained after dehydrating the aluminum hydroxide or oxyhydroxide is washed, preferably with water or an aqueous acid solution.

Before granulation of said active alumina powder, the latter preferably undergoes a flash operation.

The subject of the invention is also a process for producing alumina agglomerates of the abovementioned type, in which:

an alumina-based material is mixed and extruded in order to form it;

the extruded materials thus obtained are subjected to a heat treatment so as to give them a specific surface area of between 50 and 420 m$^2$/g;

said extruded materials are subjected to a hydrothermal treatment by impregnation with water or with an aqueous solution, preferably an aqueous acid solution, followed by residence in an autoclave at a temperature of above 80° C.; and the agglomerates thus obtained are calcined, preferably between 500 and 1300° C.

Said alumina-based material is preferably dehydrated hydrargillite.

Said alumina-based material may also come from the precipitation of boehmite, pseudo-boehmite or bayerite, or a mixture of such materials.

During the forming of said alumina powder or of said alumina-based material in one of the above processes, one or more pore-forming materials that disappear on heating are preferably added to it.

Said pore-forming materials are preferably chosen from wood flour, charcoal, sulfur, tars, plastics or emulsions of plastics, polyvinyl alcohols, naphthalene.

Said hydrothermal treatment is preferably carried out at a temperature of 150 to 270° C., preferably from 170 to 250° C., for a time of greater than 45 minutes, preferably from 1 to 24 hours and even more preferably from 1.5 to 12 hours.

Said hydrothermal treatment is preferably carried out using an aqueous acid solution containing one or more mineral and/or organic acids.

Said aqueous acid solution also preferably includes one or more compounds that can release anions capable of combining with the aluminum ions.

As will have been understood, the invention consists in obtaining, in the case of alumina agglomerates, a particular distribution of the volumes occupied by the pores of various diameter classes. It is under these conditions that mechanical strength properties equal to, or even better than, those of the usual agglomerates having an equivalent or lower overall porosity are obtained. This particular distribution may be obtained using an agglomerate manufacturing process that is distinguished from the usual processes by the execution of the alumina forming step according to the particular methods of implementation that will lead to agglomerates having the desired characteristics finally being obtained. This forming operation is followed by a short high-temperature heat treatment, or even also preceded by such a treatment.

The invention will be more clearly understood on reading the description that follows, given with reference to the single appended FIGURE. The latter shows the pore distribution of an alumina A obtained as intermediate product in an example of implementation of the process according to the invention and the pore distribution of a final alumina B according to the invention, obtained from this alumina A.

In the rest of the description, the various parameters that will be referred to are defined below.

The morphology of the aluminas is defined by the indicator of the volumes occupied by the pores having a diameter of greater than or equal to a series of given diameters, namely:

the volume occupied by the pores having a diameter greater than or equal to 37 Å ($V_{37 Å}$);

the volume occupied by the pores having a diameter of greater than or equal to 0.1 µm ($V_{0.1 \mu m}$);

the volume occupied by the pores having a diameter of greater than or equal to 0.2 µm ($V_{0.2 \mu m}$); and the volume occupied by the pores having a diameter of greater than or equal to 1 µm ($V_{1 \mu m}$).

These volumes may be measured conventionally by the technique called "mercury porosimetry".

For this purpose, the alumina specimen is placed in a column into which mercury at a pressure P is introduced. Since mercury does not wet the alumina, its penetration or its non-penetration into the pores of the specimen having a given diameter depends on the value of P. The finest pores require, in order to be filled, a higher pressure P to be established than that for filling the coarser pores. By measuring the amount of mercury penetrating the specimen for various values of P it is possible to determine the volume occupied by the pores of a diameter greater than the given values of this diameter.

The mechanical strength of the specimen is measured by two parameters: the measured particle-to-particle crush strength ($S_{pp}$) and the measured value in the shear test.

To measure the $S_{pp}$ of agglomerates, said agglomerates are initially pretreated for two hours at 300° C. in an oven and then left to cool in a dessicator. They are then taken one by one and placed between the hammer and the anvil of a compressometer until fracture. The final result is expressed in the form of a mean fracture force measured on a population of about twenty agglomerates.

The objective of the shear test is to determine the mechanical resistance to friction of spherical agglomerates. The specimen is placed in a ring-shaped cell and pressure is applied to the alumina by means of a cylinder having the same shape as the cell, which is then rotated. The specimen thus undergoes shear forces leading to a reduction in the size of the beads because of the rotation of the cell under the pressure exerted, the base of the cylinder and the bottom of the cell being also notched. The analysis reported here was carried out under a pressure of 0.4 bar, the shear being 50. The results are expressed as the percentage undersize for a screen with 1.7 mm square meshes.

A process for manufacturing alumina agglomerates according to the invention will now be described.

The process starts, as in previously known processes, with intense "flash" heating resulting in sudden dehydration of an aluminum hydroxide (hydrargillite, gibbsite or bayerite) or of an aluminum oxyhydroxide (boehmite or diaspore) by means of a stream of hot gas for removing and carrying away the evaporated water very rapidly. The temperature is around 400 to 1200° C. and the time during which the material to be dehydrated is in contact with the gases is from the order of a fraction of a second to four or five seconds. Active alumina in powder form, having a median particle size $d_{50}$ of about 40 µm, is thus obtained. As starting compound, it is preferred to use hydrargillite. Experiments have shown that this compound is the most favorable for obtaining a final product having the desired properties. In addition, it is relatively inexpensive.

The powder obtained then undergoes, preferably and as is known, a grinding operation that brings its median particle size $d_{50}$ to about 15 µm, generally between 5 and 25 µm.

Next, as is known, the powder is washed with water or with acidified water, this having in particular the purpose of reducing its alkali metal content.

According to the invention, the powder then preferably undergoes a flash operation under conditions similar to those of the flash operation described above so as to continue to develop its porosity.

Next, according to the invention, an operation of forming the alumina is carried out. According to the preferred method of implementing the invention, the alumina powder is granulated by means of a rotational technique such as, for example, a rotary pelletizer or rotary drum. This type of process makes it possible to obtain beads of controlled pore diameters and distribution, these dimensions and distributions generally being created during the agglomeration step. The porosity may be created by various means, such as the choice of particle size of the alumina powder or the agglomeration of several alumina powders of different particle sizes. Another method consists in mixing with the alumina powder, before or during the agglomeration step, one or more compounds, called pore formers, that disappear when heated and thus create porosity in the beads. As pore-forming compounds used, mention may be made, by way of example, of wood flour, charcoal, sulfur, tars, plastics or emulsions of plastics, such as polyvinyl chloride and polyvinyl alcohol, naphthalene or the like. The amount of pore-forming compounds added is determined by the desired volume.

The aim is to produce beads with a green fill density of between 500 and 1100 kg/m$^3$, preferably between 700 and 950 kg/m$^3$, for example 810 kg/m$^3$, and a diameter of predominantly between 0.8 and 10 mm, preferably between 1 and 5 mm. This granulation is itself a conventional process, but the addition of the invention lies essentially in the choice of the characteristics of the beads resulting from the granulation. These characteristics, in combination with the subsequent treatments undergone by the beads, will determine the properties of the agglomerates obtained at the end of the treatment.

Next, again according to the invention, the beads undergo a heat treatment that allows an alumina to be obtained whose specific surface area is from 50 to 420 m$^2$/g. Below 50 m$^2$/g, the reactivity of the alumina during the subsequent autoclaving operation would not be sufficient, and a specific surface area of greater than 420 m$^2$/g would correspond to pores in the final product that are too small for the applications envisioned. This alumina will be called hereafter "alumina A". An example of the pore distribution of such an alumina A is shown in the single figure. In this example, the specific surface area of this alumina A is 187 m$^2$/g. In this single FIGURE, the pore diameter (in μm) is plotted on the x-axis and the cumulative pore volume (in ml/100 g), that is to say the volume occupied by the pores having diameters greater than or equal to the diameter on the x-axis, is plotted on the y-axis.

To obtain a final alumina according to the invention, it is recommended to give alumina A a $V_{37 Å}$ of greater than 65 ml/100 g, usually greater than 70 ml/100 g.

This alumina A then undergoes a hydrothermal treatment similar to those known in the prior art, for example in the aforementioned document EP-A-0 387 109. To give an example, this treatment may consist of impregnation of alumina A with an aqueous solution containing 4% aluminum nitrate and 9% formic acid (these percentages being calculated on a weight basis with respect to the weight of alumina introduced), followed by residence of the impregnated alumina A in an autoclave with a rotating basket at 200° C. for 5 h 30 min. Generally speaking, the hydrothermal treatment is carried out at a temperature of preferably between 150 and 270° C., advantageously between 170 and 250° C. inclusive. The duration of said treatment is in general greater than 45 minutes, preferably between 1 and 24 hours and even more advantageously between 1.5 and 12 hours inclusive. The aqueous acid impregnation solution comprises one or more mineral and/or organic acids. To give an example, mention may be made of nitric acid, hydrochloric acid, perchloric acid, sulfuric acid and weak acids, the solution of which has a pH of less than 4, such as acetic acid or formic acid. It may also contain one or more compounds that can release anions capable of combining with the aluminum ions. Thus, by way of example, mention may be made of compounds comprising a nitrate (such as aluminum nitrate), chloride, sulfate, perchlorate, chloroacetate, trichloroacetate, bromo-acetate or dibromoacetate ion, and the anions of general formula: R—COO$^-$ such as formates and acetates.

Finally, as is usual, the alumina undergoes a final heat treatment (or calcination) at high temperature (typically between 400 and 1300° C., for example at 800° C.), which allows the desired specific surface area to be obtained.

Beads are the preferred form of the invention, but it is also conceivable to use, for example, materials in extruded form or crushed materials or monoliths, and also to use alumina in powder form.

According to an alternative method of implementing the invention, the alumina may also be in the form of alumina extrudates. These are generally obtained by mixing and then extruding an alumina-based material followed by calcination and then, in succession, as described above, impregnation, hydrothermal treatment and then post-forming heat treatment. The starting material may vary very widely in nature: it may result from the partial and rapid dehydration of hydrargillite, or from the precipitation of boehmite, pseudo-boehmite, bayerite or of a mixture of these aluminas. During mixing, the alumina may be mixed with additives, especially pore formers such as those defined above.

Figure 1:
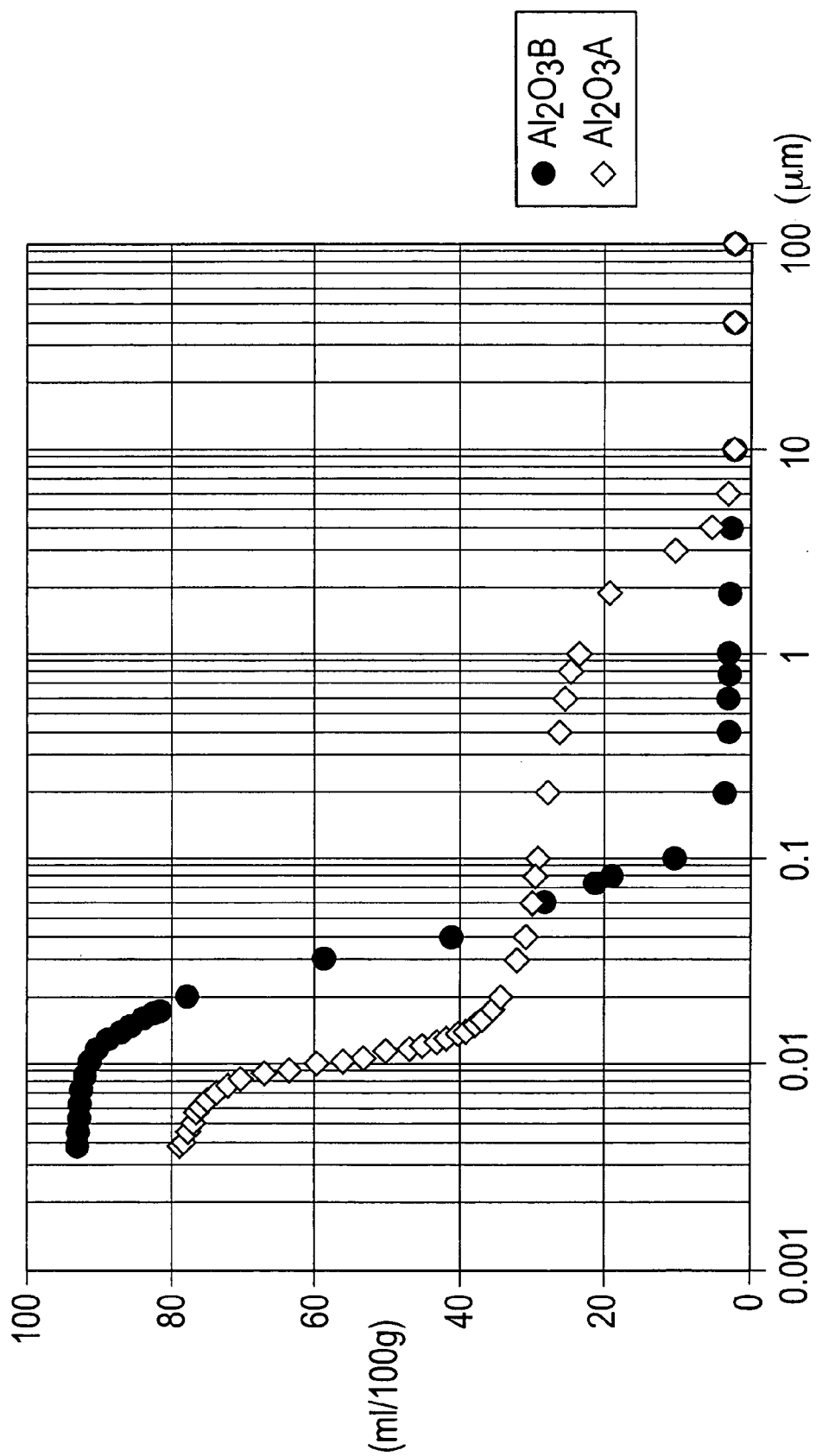
FIG. 1 shows the pore distribution of an alumina according to the invention.

The single FIGURE shows the pore distribution of an alumina according to the invention, called "alumina B", produced according to the particular example of hydrothermal and calcination treatment that was described in the case of the above alumina A. The calcination gave this alumina B a specific surface area of 110 m$^2$/g.

The single FIGURE shows that the hydrothermal and calcination treatment operations resulted in an alumina B being obtained in which, compared with the starting alumina A, the volume occupied by the pores of small size (<0.04 μm) has substantially increased. Above all, the volume occupied by the pores having a size greater than 0.2 μm decreased considerably, to the point of becoming almost negligible.

The aluminas according to the invention are preferably obtained from hydrargillite; they have a $V_{37 Å}$ of at least 75 ml/100 g, preferably greater than 80 ml/100 g and even more preferably greater than 85 ml/100 g. At the same time, their $V_{0.1 \mu m}$ is less than or equal to 30 ml/100 g, preferably less than or equal to 25 ml/100 g and even more preferably less than 20 ml/100 g, or even less than 15 ml/100 g. They have a $V_{0.2 \mu m}$ of less than or equal to 20 ml/100 g, advantageously less than or equal to 15 ml/100 g or even less than or equal to 10 ml/100 g. As regards the $V_{1 \mu m}$, it is beneficial for it not to exceed 7 ml/100 g, or even 5.5 ml/100 g, preferably 4 ml/100 g. The $V_{0.1 \mu m}/V_{0.2 \mu m}$ ratio is preferably greater than or equal to 1.5, or even greater than or equal to 2, and even more advantageously greater than or equal to 2.5.

Under these conditions, and when the aluminas according to the invention are in the form of beads having diameters of between 2.0 and 2.8 mm, they have a minimum $S_{pp}$ of 2 daN, preferably equal to or greater than 2.5 daN, or even equal to or greater than 3 daN, and even more advantageously exceeding 3.5 daN. As regards the shear test measured under the abovementioned conditions, this gives values of less than 4%, usefully less than 3% and even more advantageously less than 2% or even less than 1%.

Table I gives the characteristics of several aluminas according to the invention, obtained by varying the experimental conditions that have determined the forming of the beads and the following hydrothermal treatment. Their particle size is in this case systematically between 2.0 and 2.8 mm inclusive. A comparison is made with aluminas produced in a similar manner, with the same particle size, but without taking the same care of controlling the porosity profile. All the specific surface areas were normalized, by calcination, to 105±5 m²/g in order to allow a comparison to be made that excludes the influence of this parameter.

Aluminas 1 to 8 are according to the invention, while aluminas 9 to 11 are comparative examples not according to the invention.

The specific surface areas are given in m²/g, all the volumes are in ml/100 g, the $S_{pp}$ values are in daN and the measurements obtained from the shear test are in % (cf. operating methods above).

It should be noted that the control specimens 9 to 11 all have a high $V_{37 Å}$, in accordance with one of the obligatory characteristics of the aluminas of the invention. However, they have a $V_{0.1 \mu m}$ and a $V_{0.2 \mu m}$ that are higher than the maximum required by the invention, coupled with a $V_{1 \mu m}$ of greater than the preferred upper limit of the invention. This means that these specimens have a quantity of large-diameter pores that is relatively higher than that required by the invention. However, these specimens have only relatively mediocre mechanical properties as regards crush strength ($S_{pp}$) and resistance to friction (shear).

This major influence of the presence of large-diameter pores is also found when the results of specimens 1 to 8 according to the invention are examined. The best mechanical strength results are obtained for specimens 7 and 8, the $V_{37 Å}$ of which is not exceptionally high, and these specimens are distinguished from the others by particularly low $V_{0.1 \mu m}$, $V_{0.2 \mu m}$ and $V_{1 \mu m}$ values. It has been found that this pore distribution gives these specimens a crush strength very substantially higher than that of the other specimens, although their shear strength is at least very good. The best results are obtained with specimen 7 that has the lowest $V_{0.1 \mu m}$ and $V_{0.2 \mu m}$ values of the series.

It may also be noted that specimens (1, 2, 6) having a very high $V_{37 Å}$, and therefore a very high overall porosity, but $V_{0.1 \mu m}$, $V_{0.2 \mu m}$, $V_{1 \mu m}$ and $V_{0.1 \mu m}/V_{0.2 \mu m}$ values within the necessary or preferred limits of the invention, nevertheless have mechanical properties that are still substantially better than those of the control specimens. However, these have a lower overall porosity that would a priori lead to a

TABLE I

Characteristics of the aluminas described

|  | Alumina | Specific surface area | $V_{37 Å}$ | $V_{0.1 \mu m}$ | $V_{0.2 \mu m}$ | $V_{1 \mu m}$ | $V_{0.1 \mu m}/V_{0.2 \mu m}$ | $S_{pp}$ | Shear |
|---|---|---|---|---|---|---|---|---|---|
| Invention | 1 | 110 | 93.9 | 19.4 | 6.6 | 2.7 | 2.9 | 3.4 | 0.8 |
|  | 2 | 104 | 92.2 | 30.3 | 9.4 | 3.2 | 3.2 | 3.0 | 0.5 |
|  | 3 | 105 | 84.3 | 14.0 | 6.9 | 2.1 | 2.0 | 4.5 | 0.7 |
|  | 4 | 103 | 87.2 | 27.8 | 13.5 | 3.8 | 2.1 | 3.3 | 1.5 |
|  | 5 | 106 | 87.2 | 26.4 | 17.5 | 5.3 | 1.5 | 3.0 | 1.6 |
|  | 6 | 105 | 101.2 | 30.5 | 15.5 | 5.0 | 2.0 | 2.9 | 1.8 |
|  | 7 | 110 | 86.2 | 7.0 | 2.7 | 2.1 | 2.6 | 6.6 | 0.5 |
|  | 8 | 102 | 87.8 | 9.9 | 3.8 | 2.0 | 2.6 | 6.3 | 0.9 |
| Comparative examples | 9 | 105 | 91.6 | 34.0 | 24.9 | 7.4 | 1.4 | 1.6 | 6.9 |
|  | 10 | 100 | 87.2 | 31.3 | 21.6 | 7.1 | 1.4 | 2.0 | 4.3 |
|  | 11 | 104 | 85.7 | 32.3 | 22.5 | 5.9 | 1.4 | 1.8 | 4.9 |

As may be seen, precise control of the density of the pores of diameter greater than or equal to 0.1 μm and of the pores having diameters of greater than or equal to 0.2 μm is, unexpectedly and in a surprising proportion, given the prior knowledge, essential for achieving agglomerates with the maximum mechanical strength independently of the level of total porosity of the alumina.

All the specimens according to the invention have a $V_{37 Å}$ of greater than 75 ml/100 g and a $V_{0.1 \mu m}$ of less than 31 ml/100 g. They also have a $V_{0.2 \mu m}$ of less than 20 ml/100 g. They also have a $V_{1 \mu m}$ of less than 7 ml/100 g and a $V_{0.1 \mu m}/V_{0.2 \mu m}$ ratio of at least 1.5, in accordance with the preferred characteristics of the invention. However, it should be pointed out that the features that have been given as preferred are independent of one another and that it would remain in accordance with the invention to comply with some of them without complying with the others.

better mechanical strength. Here again, controlling the presence of pores having diameters of greater than 0.1 μm, or even 0.2 μm and 1 μm, under the specified conditions appears to be particularly advantageous. Measuring the $V_{0.1 \mu m}/V_{0.2 \mu m}$ ratio gives an indicator of what the distribution of the pore diameters in the 0.1–0.2 μm range should be.

The invention is applicable for obtaining catalyst supports in the form of beads, especially those for the petroleum industry and the petrochemical industry, in which the combination of a high porosity and a high mechanical strength of the supports gives effective catalysts with a long lifetime. These catalysts may be used, for example, in hydrotreatment, particularly in hydrometallation, to reduce the metal content of a hydrocarbon cut.

These alumina agglomerates can also be used as intrinsic catalysts or as adsorbents.

The invention claimed is:

1. Alumina agglomerates of the type obtained by the treatment of an aluminum hydroxide or oxyhydroxide, agglomeration of the alumina thus obtained, hydrothermal treatment of the agglomerates and calcination, wherein:
   they have a $V_{37 \text{ Å}}$ of greater than or equal to 75 ml/100 g,
   they have a $V_{0.1 \text{ μm}}$ of less than or equal to 31 ml/100 g,
   they have a $V_{0.2 \text{ μm}}$ of less than or equal to 20 ml/100 g.

2. The alumina agglomerates as claimed in claim 1, wherein they have a $V_{1 \text{ μm}}$ of less than or equal to 7 ml/100 g.

3. The alumina agglomerates as claimed in claim 1 wherein they have a $V_{0.1 \text{ μm}}/V_{0.2 \text{ μm}}$ ratio of greater than or equal to 1.5.

4. The alumina agglomerates as claimed in claim 1 wherein they have simultaneously a $V_{37 \text{ Å}}$ of greater than or equal to 80 ml/100 g, a $V_{0.1 \text{ μm}}$ of less than or equal to 15 ml/100 g, a $V_{0.2 \text{ μm}}$ of less than or equal to 10 ml/100 g, a $V_{1 \text{ μm}}$ of less than or equal to 4 ml/100 g and a $V_{0.1 \text{ μm}}/V_{0.2 \text{ μm}}$ ratio of greater than or equal to 2.5.

5. The alumina agglomerates as claimed in claim 1 wherein they have been obtained from dehydrated hydrargillite.

6. The alumina agglomerates as claimed in claim 1 wherein they are in the form of beads.

7. The alumina agglomerates as claimed in claim 1 wherein they are in the form of extruded materials.

8. The alumina agglomerates as claimed in claim 1 wherein they are in the form of crushed materials.

9. The alumina agglomerates as claimed in claim 1 wherein they are in the form of monoliths.

10. A catalyst support, especially for the petroleum or petrochemical industry, wherein it consists of alumina agglomerates as claimed in claim 1.

11. An intrinsic catalyst, especially for the petroleum or petrochemical industry wherein it consists of alumina agglomerates as claimed in claim 1.

12. An adsorbent, especially for the petroleum or petrochemical industry, wherein it consists of alumina agglomerates as claimed in claim 1.

13. A process for producing alumina agglomerates as claimed in claim 6, in which:
   an aluminum hydroxide or oxyhydroxide, or hydrargillite, undergoes flash dehydration in order to obtain an active alumina powder;
   said active alumina powder undergoes a forming operation so as to obtain beads with a green fill density of between 500 and 1100 kg/m³, and a diameter between 0.8 and 10 mm;
   said beads undergo a heat treatment so as to provide them with a specific surface area of between 50 and 420 m²/g;
   said beads undergo a hydrothermal treatment by impregnation with water or an aqueous solution or aqueous acid solution, followed by residence in an autoclave at a temperature of above 80° C.; and
   the agglomerates thus obtained are calcined between 500 and 1300° C.

14. The process as claimed in claim 13, wherein after the heat treatment that follows granulation, the alumina beads have a $V_{37 \text{ Å}}$ of greater than 65 ml/100.

15. The process as claimed in claim 13 wherein the active alumina powder obtained after dehydrating the aluminum hydroxide or oxyhydroxide is ground in order to obtain a powder with a median particle size $d_{50}$ of between 5 and 25 μm.

16. The process as claimed in claim 13 wherein the active alumina powder obtained after dehydrating the aluminum hydroxide or oxyhydroxide is washed with water or an aqueous acid solution.

17. The process as claimed in claim 13 wherein prior to the forming operation of said active alumina powder, the latter undergoes a flash operation.

18. The process as claimed in claim 13 wherein during the forming of said alumina powder or of said alumina-based material, one or more pore-forming materials that disappear on heating are added to it.

19. The process as claimed in claim 18, wherein said pore-forming materials are chosen from wood flour, charcoal, sulfur, tars, plastics or emulsions of plastics, polyvinyl alcohols, naphthalene.

20. The process as claimed in claim 13 wherein said hydrothermal treatment is carried out at a temperature of 150 to 270° C., for a time of greater than 45 minutes.

21. The process as claimed in claim 13 wherein said hydrothermal treatment is carried out using an aqueous acid solution containing one or more mineral and/or organic acids.

22. The process as claimed in claim 21, wherein said aqueous acid solution also includes one or more compounds that can release anions capable of combining with the aluminum ions.

23. The process for producing alumina agglomerates as claimed in claim 7, in which:
   an alumina-based material is mixed and extruded in order to form it;
   the extruded materials thus obtained are subjected to a heat treatment so as to give them a specific surface area of between 50 and 420 m²/g;
   said extruded materials are subjected to a hydrothermal treatment by impregnation with water or with an aqueous solution or with an aqueous acid solution, followed by residence in an autoclave at a temperature of above 80° C.; and
   the agglomerates thus obtained are calcined between 500 and 1300° C.

24. The process as claimed in claim 23, wherein said alumina-based material is dehydrated hydrargillite.

25. The process as claimed in claim 23, wherein alumina-based material comes from the precipitation of boehmite, pseudo-boehmite or bayerite, or a mixture of such materials.

* * * * *